(12) United States Patent
Hoshino et al.

(10) Patent No.: US 11,008,731 B2
(45) Date of Patent: May 18, 2021

(54) WORK VEHICLE

(71) Applicant: KOMATSU LTD., Tokyo (JP)

(72) Inventors: Masashi Hoshino, Tokyo (JP); Atsushi Karami, Tokyo (JP); Hirofumi Kotaki, Tokyo (JP); Shinji Hirose, Tokyo (JP); Masamichi Miyazaki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 83 days.

(21) Appl. No.: 16/466,326

(22) PCT Filed: Mar. 31, 2017

(86) PCT No.: PCT/JP2017/013787
§ 371 (c)(1),
(2) Date: Jun. 4, 2019

(87) PCT Pub. No.: WO2018/179409
PCT Pub. Date: Oct. 4, 2018

(65) Prior Publication Data
US 2020/0032479 A1 Jan. 30, 2020

(51) Int. Cl.
| | |
|---|---|
| *B60R 21/11* | (2006.01) |
| *B60R 21/13* | (2006.01) |
| *B62D 33/06* | (2006.01) |
| *E02F 9/16* | (2006.01) |
| *H01Q 1/32* | (2006.01) |
| *E02F 9/26* | (2006.01) |

(52) U.S. Cl.
CPC ................ *E02F 9/16* (2013.01); *B60R 21/11* (2013.01); *B60R 21/13* (2013.01); *B62D 33/06* (2013.01); *E02F 9/163* (2013.01); *E02F 9/26* (2013.01); *H01Q 1/3275* (2013.01)

(58) Field of Classification Search
CPC ......... B62D 33/06; B60R 21/11; B60R 21/13; B60R 21/131; B60R 2021/137; E02F 9/16; E02F 9/163; E02F 9/26; H01Q 1/3275
See application file for complete search history.

(56) References Cited

U.S. PATENT DOCUMENTS

| | | | |
|---|---|---|---|
| 2006/0249986 A1* | 11/2006 | Yoon | B60R 21/131 296/190.03 |
| 2010/0032984 A1* | 2/2010 | Murakami | B62D 33/0617 296/190.03 |
| 2014/0022129 A1 | 1/2014 | Yoon | |
| 2014/0252803 A1* | 9/2014 | Matsumoto | H01Q 1/3275 296/190.01 |
| 2016/0093945 A1* | 3/2016 | Grodahl | E04H 12/18 248/514 |

(Continued)

FOREIGN PATENT DOCUMENTS

| | | |
|---|---|---|
| JP | S60-114413 U | 8/1985 |
| JP | 1278235 S | 8/2006 |

(Continued)

*Primary Examiner* — Gregory A Blankenship
(74) *Attorney, Agent, or Firm* — Faegre Drinker Biddle & Reath LLP (57) ABSTRACT

A work vehicle includes: a cab to be boarded by an operator, the cab including a roof; and a first antenna mounted on the roof. The first antenna is positioned selectively at one of a position lower than a topmost portion of the roof, and a position protruding upward relative to the topmost portion of the roof.

4 Claims, 10 Drawing Sheets

(56) References Cited

U.S. PATENT DOCUMENTS

| | | | |
|---|---|---|---|
| 2016/0114837 A1* | 4/2016 | Iwahashi | E02F 9/16 |
| | | | 296/190.08 |
| 2016/0312438 A1* | 10/2016 | Kotaki | E02F 9/163 |
| 2018/0073214 A1* | 3/2018 | Tsukamoto | E02F 9/205 |
| 2019/0027820 A1* | 1/2019 | Yamada | E02F 9/0891 |
| 2019/0384321 A1* | 12/2019 | Nishi | G05D 1/0278 |
| 2020/0032479 A1* | 1/2020 | Hoshino | H01Q 1/1235 |
| 2020/0251809 A1* | 8/2020 | Hanada | H01Q 21/28 |

FOREIGN PATENT DOCUMENTS

| | | |
|---|---|---|
| JP | 2014-512772 A | 5/2014 |
| WO | WO-2016/043344 A1 | 3/2016 |

* cited by examiner

WORK VEHICLE

TECHNICAL FIELD

The present disclosure relates to a work vehicle.

BACKGROUND ART

A roof of a cab of a work vehicle such as bulldozer may be equipped with antennas for a variety of uses such as radio broadcasting, data communication, remote control, and satellite measurement. Japanese Design Registration No. 1278235 (PTL 1) discloses an antenna protruding upward relative to the upper edge of a cab.

CITATION LIST

Patent Literature

PTL 1: Japanese Design Registration No. 1278235

SUMMARY OF INVENTION

Technical Problem

For transportation of a work vehicle for the sake of delivery from a factory, for example, there arises the need to remove and separately transport its antenna in order to meet the height specified by transportation regulations, which requires troublesome work. The trace of the removed antenna has to be covered for transportation. The removed antenna has to be stored and managed separately, which requires further troublesome work.

The present disclosure provides a work vehicle that enables efficiency of a transportation work to be improved.

Solution to Problem

According to the present disclosure, a work vehicle is provided that includes a cab to be boarded by an operator, and an antenna. The cab includes a roof. The antenna is mounted on the roof. The antenna is positionable selectively at one of a first arrangement position located lower than a topmost portion of the roof, and a second arrangement position protruding upward relative to the topmost portion of the roof.

Advantageous Effects of Invention

The work vehicle according to the present disclosure enables efficiency of a transportation work to be improved.

DESCRIPTION OF EMBODIMENTS

In the following, an embodiment of a work vehicle is described with reference to the drawings. The same components or corresponding components are denoted by the same reference numerals, and the same description may not be repeated in some cases.

Initially, a description is given of a configuration of a bulldozer as an example of the work vehicle according to the embodiment. The present embodiment, however, is also applicable to a work vehicle having a cab to be boarded by an operator, such as hydraulic excavator, wheel loader, or motor grader, for example.

Figure 1:
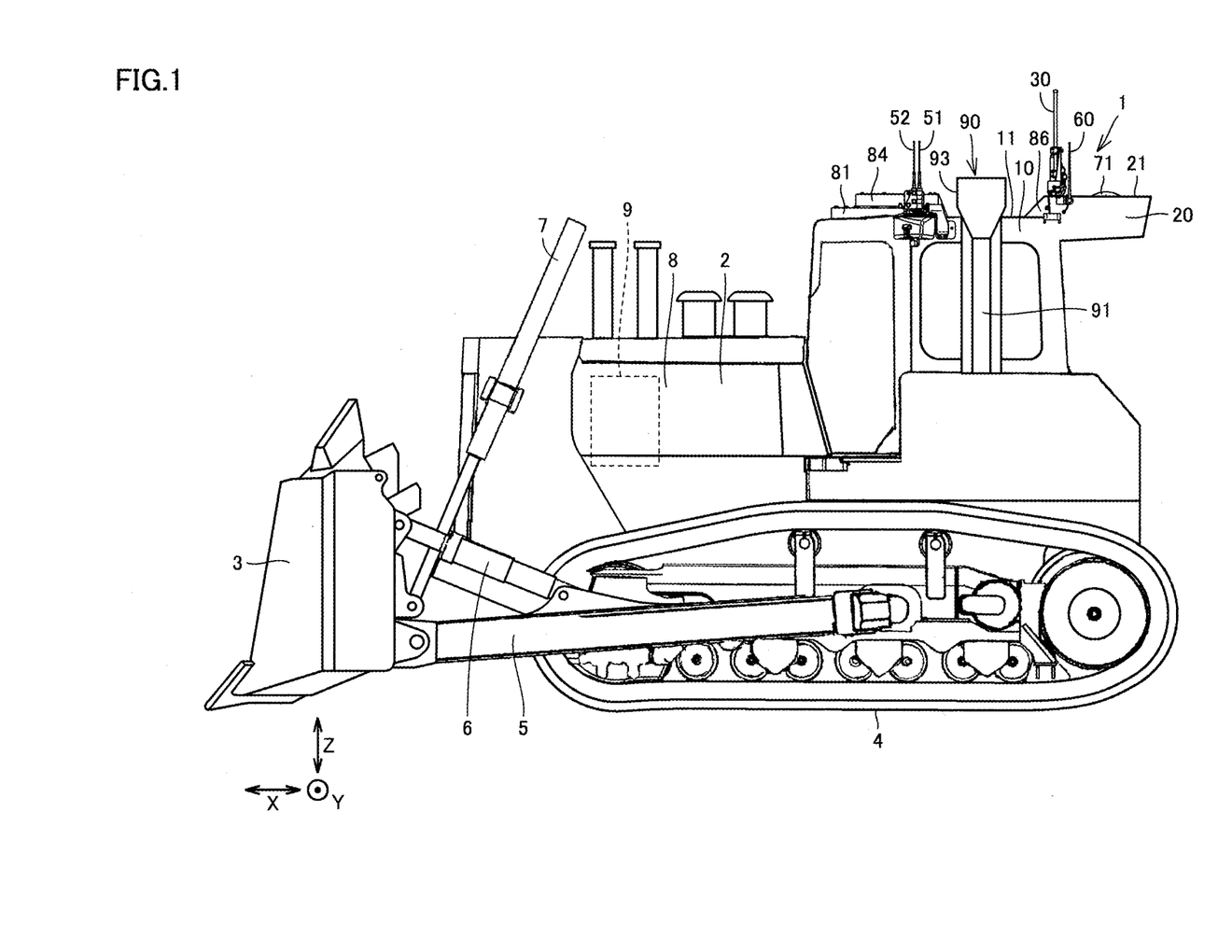
FIG. 1 is a side view schematically showing a configuration of a work vehicle according to an embodiment.

FIG. 1 is a side view schematically showing a configuration of a work vehicle according to an embodiment. As shown in FIG. 1, a bulldozer 1 of the present embodiment mainly includes a vehicular body 2, a blade 3, and a traveling device. The traveling device has a pair of right and left crawler type carriers 4 separated from each other in the vehicular width direction. Vehicular body 2 is disposed between the paired right and left crawler type carriers 4. Blade 3 is disposed at a frontward position of vehicular body 2.

Vehicular body 2 has a cab 10 and an engine compartment 8. Cab 10 is disposed in an upper rear portion of vehicular body 2. Engine compartment 8 is disposed frontward of cab 10. Engine compartment 8 is disposed between cab 10 and blade 3. In engine compartment 8, an engine 9 is housed. An operator who is to operate bulldozer 1 is to aboard cab 10. Cab 10 has, in its inside, an operator's seat for an operator to sit, and is configured to surround the operator's seat.

In the present embodiment, the direction in which bulldozer 1 travels straight forward is referred to as front-rear direction of bulldozer 1. In the front-rear direction of bulldozer 1, the direction in which blade 3 protrudes from vehicular body 2 is referred to as frontward direction. In the front-rear direction of bulldozer 1, the direction opposite to the frontward direction is referred to as rearward direction. The left-right direction of bulldozer 1 is the direction orthogonal to the front-rear direction as seen in plan view. From the viewpoint in the frontward direction, the right side and the left side in the left-right direction are respectively rightward direction and leftward direction. The top-bottom direction of bulldozer 1 is the direction orthogonal to a plane defined by the front-rear direction and the left-right direction. In the top-bottom direction, the ground side is lower side and the sky side is upper side.

The front-rear direction is the front-rear direction with respect to an operator sitting on the operator's seat in cab 10. The left-right direction is the left-right direction with respect to an operator sitting on the operator's seat. The left-right direction is the vehicular width direction of bulldozer 1. The top-bottom direction is the top-bottom direction with respect to an operator sitting on the operator's seat. The direction in which an operator sitting on the operator's seat faces is the frontward direction, and the backward direction with respect to an operator sitting on the operator's seat is the rearward direction. The right side and the left side with respect to an operator sitting on the operator's seat and facing frontward are respectively the rightward direction and the leftward direction. The feet side and the head side of an operator sitting on the operator's seat are respectively the lower side and the upper side.

In the following drawings, the front-rear direction is indicated by an arrow X, the left-right direction is indicated by an arrow Y, and the top-bottom direction is indicated by an arrow Z.

Bulldozer 1 includes blade 3 located frontward as a work implement. Blade 3 is a work implement for performing work such as excavating earth and sand and grading. Blade 3 is supported at each of its right side and left side by a frame 5. Frame 5 is a member in the shape of a quadrangular prism. One end of frame 5 is attached to the back surface of blade 3 by a rotatable support. The other end of frame 5 is supported on a side surface of the traveling device. The right frame 5 and the back surface of blade 3 are coupled together by an arm (not shown).

Blade 3 is actuated by a tilt cylinder 6 and a lift cylinder 7. One end of tilt cylinder 6 is supported on the back surface of blade 3. The other end of tilt cylinder 6 is supported on the upper surface of frame 5. Tilt cylinder 6 is extended/contracted by hydraulic pressure to cause one of the ends of blade 3 in the left-right direction to move in the top-bottom direction about the support with which frame 5 on the other side in the left-right direction is attached to blade 3. Accordingly, the tilt angle of blade 3 is changed.

One end of lift cylinder 7 is supported on the back surface of blade 3. An intermediate portion of lift cylinder 7 is supported on a side surface of vehicular body 2. Lift cylinder 7 is extended/contracted by hydraulic pressure to cause blade 3 to move in the top-bottom direction about the other end of frame 5.

Bulldozer 1 may include a ripper device behind vehicular body 2 as another work implement.

Bulldozer 1 is equipped with a rollover protection structure 90. Rollover protection structure 90 has been standardized by ISO3471. Rollover protection structure 90 is configured to be attachable to and detachable from bulldozer 1. Rollover protection structure 90 includes a left column 91, a beam 93, and a right column 92 (FIG. 2).

Figure 2:
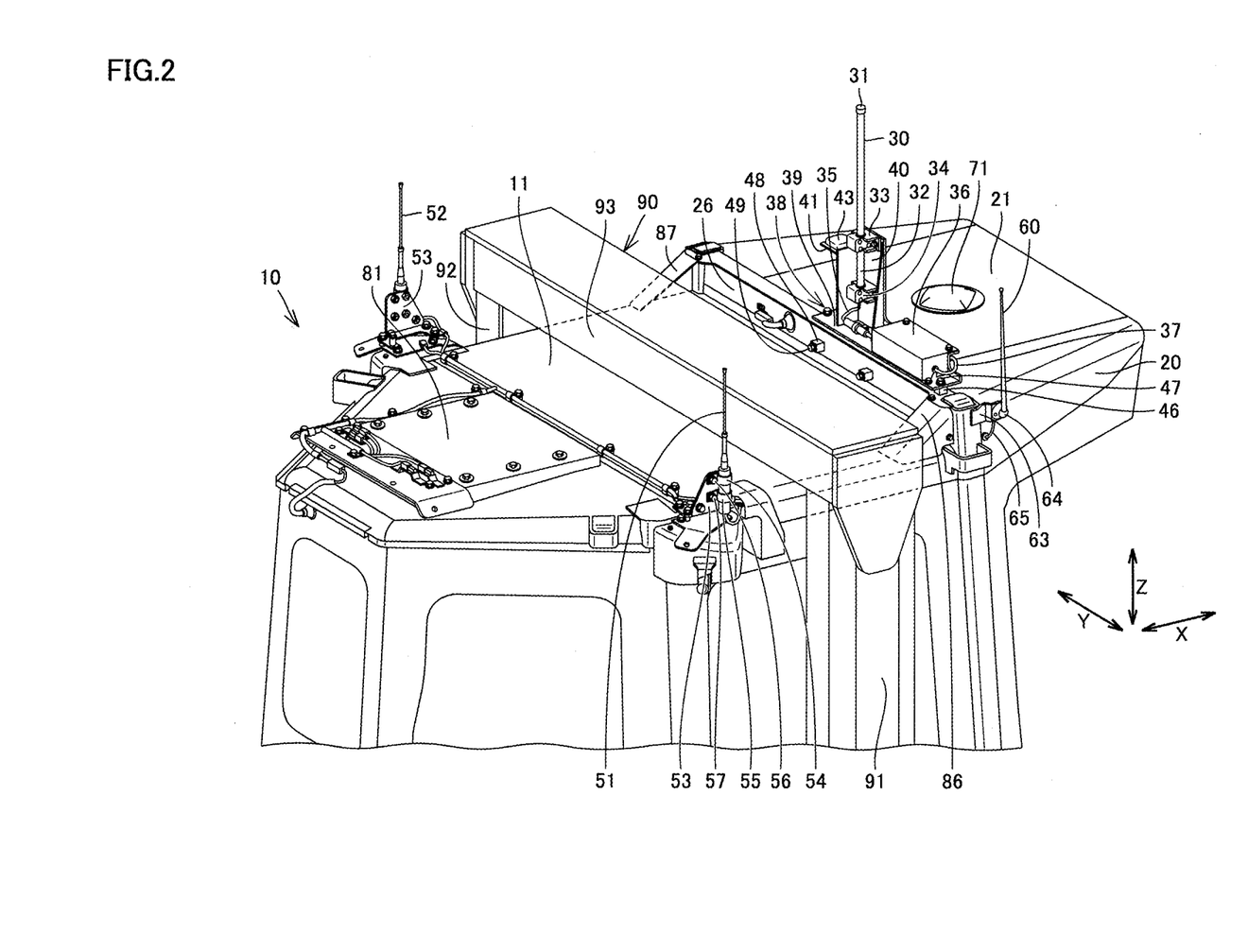
FIG. 2 is a perspective view of a cab shown in FIG. 1.

FIG. 2 is a perspective view of cab 10 shown in FIG. 1. In a state as shown in FIGS. 1 and 2 depicting bulldozer 1 equipped with rollover protection structure 90, left column 91 is located on the left side of cab 10, and right column 92 is located on the right side of cab 10. In the state as shown in FIG. 1 depicting bulldozer 1 equipped with rollover protection structure 90, beam 93 is located above cab 10.

Beam 93 has a left end coupled to the upper end of left column 91, and a right end coupled to the upper end of right column 92. Beam 93 is supported by left column 91 and right column 92. Beam 93 extends in the left-right direction between left column 91 and right column 92.

In the state as shown in FIGS. 1 and 2 depicting bulldozer 1 equipped with rollover protection structure 90, left column 91, right column 92, and beam 93 are located between center pillars and rear pillars of cab 10 in the front-rear direction. Left column 91 and right column 92 are each located at a position overlapping the operator's seat in cab 10 as seen in side view of cab 10. Beam 93 is located at a position overlapping the operator's seat in cab 10 as seen in plan view of cab 10.

Cab 10 includes a roof. A plurality of antennas are mounted on the roof of cab 10. In the following, a detailed description is given of a configuration of the roof of cab 10 and a plurality of antennas mounted on the roof.

Cab 10 includes a roof panel 11. Roof panel 11 forms a part of the roof of cab 10. As shown in FIG. 2, roof panel 11 has a substantially hexagonal shape of which front side has a narrower width (the dimension in the left-right direction) as seen in plan view. At respective vertices of the hexagonal shape, a pair of left and right front pillars disposed in a front portion of cab 10, a pair of left and right rear pillars disposed in a rear portion of cab 10, and a pair of left and right center pillars disposed in a central portion of cab 10 in the front-rear direction are arranged.

In a front portion of roof panel 11, a base 81 is disposed for attaching devices to roof panel 11. On the right side of base 81, a container box 84 is disposed. In container box 84, a connector is housed for electrically connecting a device attached to base 81 and an electrical device located in cab 10. FIG. 2 shows a state where container box 84 shown in FIG. 1 has been removed from roof panel 11.

On the upper rear side of cab 10, a condenser unit 20 is disposed. Condenser unit 20 is disposed to protrude rearward from the rear portion of cab 10. Condenser unit 20 is supported on the upper ends of the rear pillars of cab 10. Condenser unit 20 is disposed on the upper side of a rear window (not shown) of cab 10. In condenser unit 20, devices constituting an air conditioner for conditioning the air in cab 10, such as heat exchanger and blower, for example, are disposed.

The upper surface of condenser unit 20 forms a part of the roof of cab 10. The roof of cab 10 includes roof panel 11 and an upper surface 21 of condenser unit 20. The height position of upper surface 21 of condenser unit 20 is higher than the height position of roof panel 11 of cab 10. Upper surface 21 of condenser unit 20 is displaced upward relative to roof panel 11 of cab 10. Between roof panel 11 of cab 10 and upper surface 21 of condenser unit 20, a step is formed.

The roof of cab 10 is stepped. Roof panel 11 of cab 10 forms the lower stage surface of the step of the roof of cab 10. Upper surface 21 of condenser unit 20 forms the upper stage surface of the step of the roof of cab 10.

As shown in FIG. 2, roof panel 11 of cab 10 and upper surface 21 of condenser unit 20 are coupled together by a step riser surface 26. Step riser surface 26 extends in the top-bottom direction and the left-right direction. Step riser surface 26 extends substantially orthogonal to both roof panel 11 of cab 10 and upper surface 21 of condenser unit 20. Roof panel 11 of cab 10, step riser surface 26, and upper surface 21 of condenser unit 20 form the step of the roof of cab 10.

A cover member 86 is disposed on the left end of the step. A cover member 87 is disposed on the right end of the step. Cover members 86, 87 each have a substantially right triangular shape as seen in side view, and the hypotenuse of the right triangle connects the lower stage surface and the upper stage surface of the step to each other. As shown in FIG. 1, cover members 86, 87 conceal the step as seen in side view so as to improve the aesthetic aspect of the design of cab 10.

Cover members 86, 87 cover a part of step riser surface 26. Step riser surface 26 is exposed frontward between cover member 86 and cover member 87 in the left-right direction.

A first antenna 30 and a second antenna 43 are attached to a front edge portion of upper surface 21 of condenser unit 20 with a bracket 38 interposed therebetween.

Figure 3:
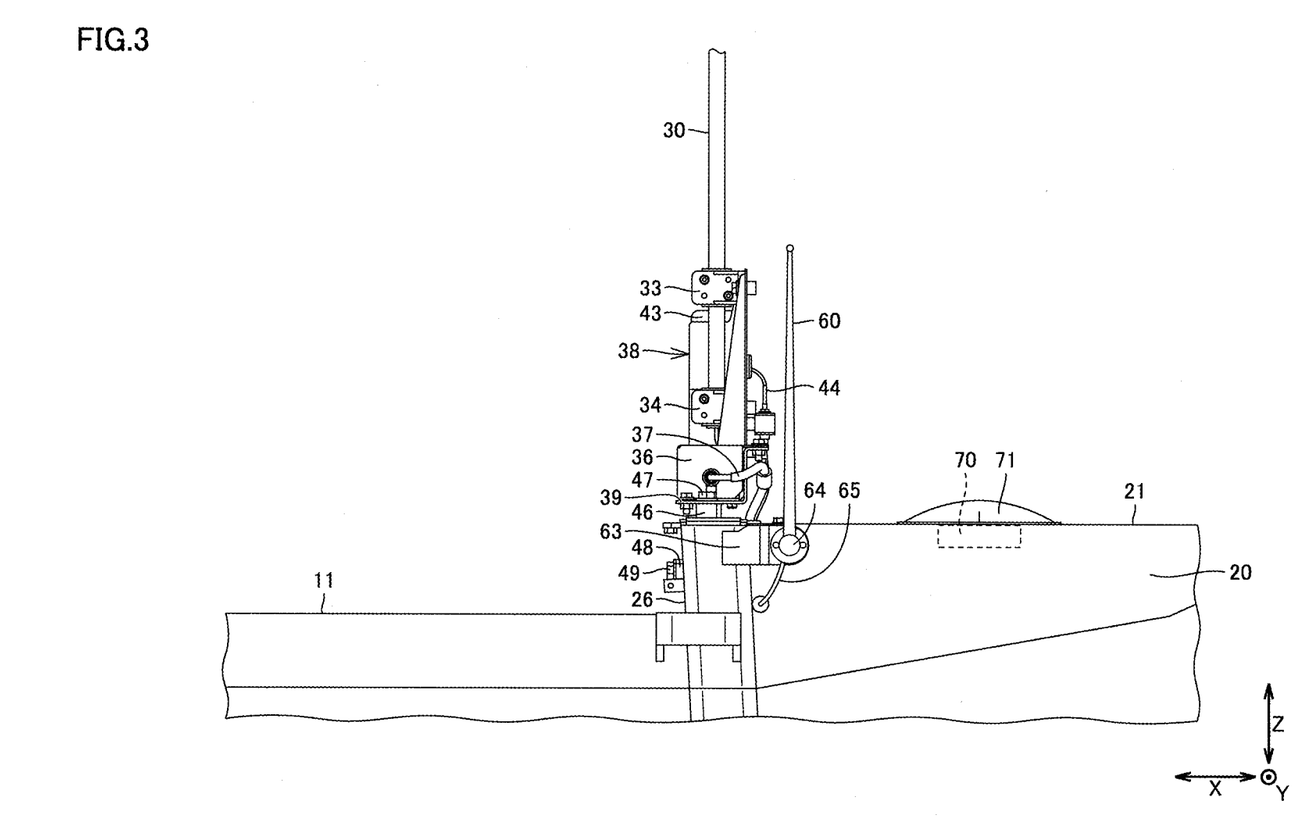
FIG. 3 is an enlarged side view of a front edge portion of an upper surface of a condenser unit.

FIG. 3 is an enlarged side view of the front edge portion of upper surface 21 of condenser unit 20.

First antenna 30 includes a top end portion 31 and a bottom end portion 32. In the arrangement shown in FIGS. 2 and 3 in which first antenna 30 is erected with respect to upper surface 21 of condenser unit 20, top end portion 31 is an end of first antenna 30 located relatively further from upper surface 21 of condenser unit 20, while bottom end portion 32 is an end of first antenna 30 located relatively closer to upper surface 21 of condenser unit 20. First antenna 30 includes coupling portions 33, 34 in the vicinity of bottom end portion 32.

A wire 35 is connected to bottom end portion 32 of first antenna 30. Wire 35 extends into a box 36. Wire 35 connects first antenna 30 and box 36 to each other.

First antenna 30 is an antenna (Wi-Fi antenna) used for data communication over a wireless LAN, for example. Box 36 houses a modem, for example. Wire 35 connects first antenna 30 to the modem housed in box 36. A wire 37 is also connected to the modem. Wire 37 extends through upper surface 21 into condenser unit 20.

Bracket 38 includes a bottom portion 39, an erect portion 40, and a support portion 41. Bottom portion 39 has a flat plate shape and is disposed in substantially parallel with upper surface 21 of condenser unit 20. Box 36 is mounted on bottom portion 39. Erect portion 40 extends orthogonally to bottom portion 39. Coupling portions 33, 34 for first antenna 30 are fixed to erect portion 40. Support portion 41 supports second antenna 43.

Second antenna 43 is mounted on support portion 41 of bracket 38. Second antenna 43 is a satellite communication antenna, for example. A wire 44 is connected to second antenna 43. Wire 44 extends through upper surface 21 into condenser unit 20.

First antenna 30, second antenna 43, and box 36 are mounted on bracket 38. First antenna 30, second antenna 43, and box 36 are mounted on bracket 38 to accordingly constitute an integrated structure. A pedestal 46 is attached to upper surface 21 of condenser unit 20. Bottom portion 39 of bracket 38 is mounted on pedestal 46. A fastening bolt 47 inserted through bottom portion 39 of bracket 38 is tightened into pedestal 46 so as to fix bracket 38 to pedestal 46.

Figure 4:
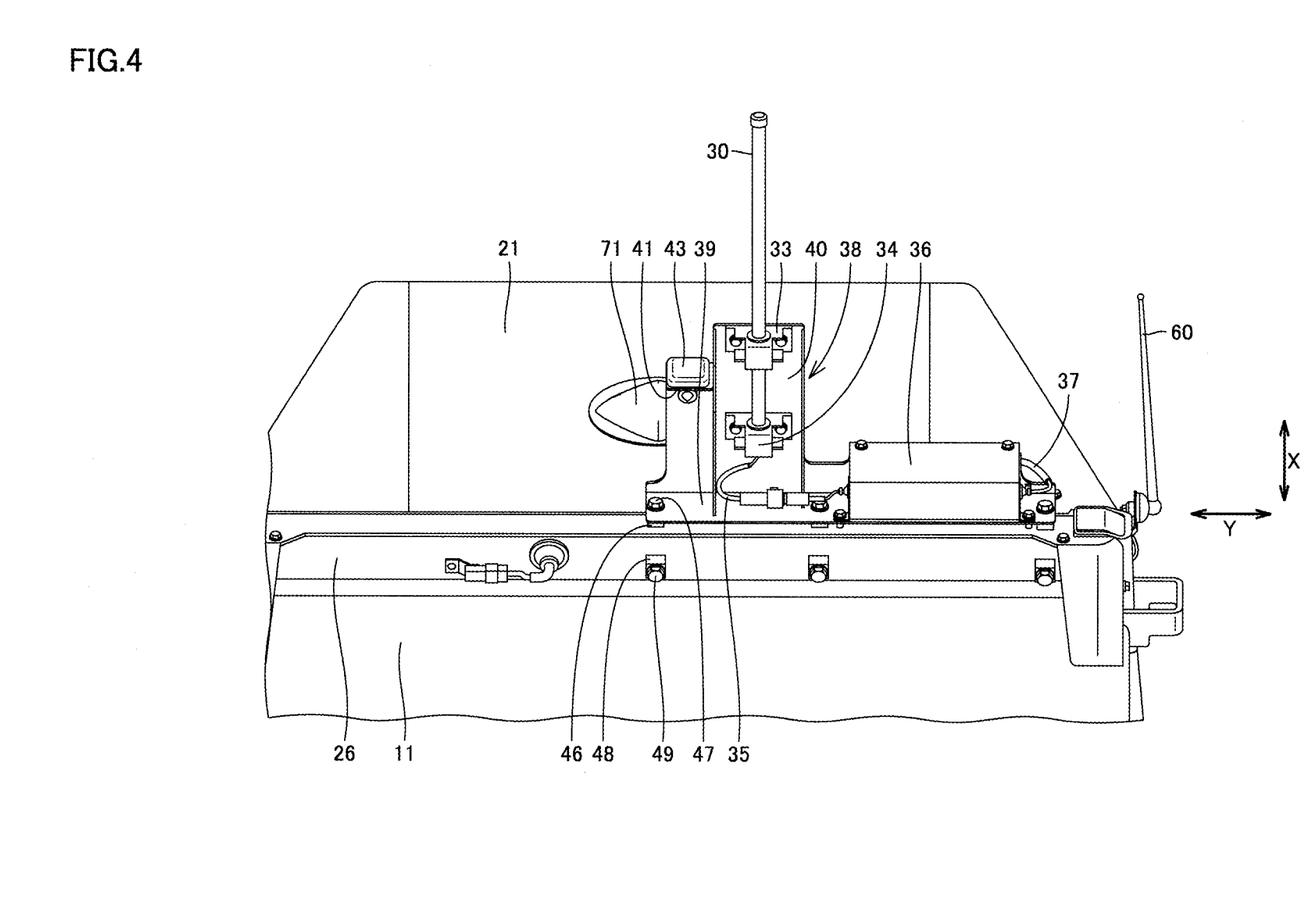
FIG. 4 is a perspective front view of the front edge portion of the upper surface of the condenser unit.

FIG. 4 is a perspective front view of the front edge portion of upper surface 21 of condenser unit 20. As shown in FIG. 4, three pedestals 46 arranged in the left-right direction are attached to upper surface 21 of condenser unit 20. Fastening bolt 47 is tightened into each of three pedestals 46. Bottom portion 39 of bracket 38 is fixed to pedestals 46 with fastening bolts 47 at the opposite ends and the center of bottom portion 39. Bracket 38 is fixed at multiple sites to enable firmer fastening.

As shown in FIG. 4, three pedestals 48 arranged in the left-right direction are also mounted on step riser surface 26. A fastening bolt 49 is tightened into each of three pedestals 48.

In the left-right direction, pedestals 46 mounted on upper surface 21 of condenser unit 20 are arranged at the same positions as those of pedestals 48 mounted on step riser surface 26. Pedestal 46 and corresponding pedestal 48 are arranged in the front-rear direction.

Figure 5:
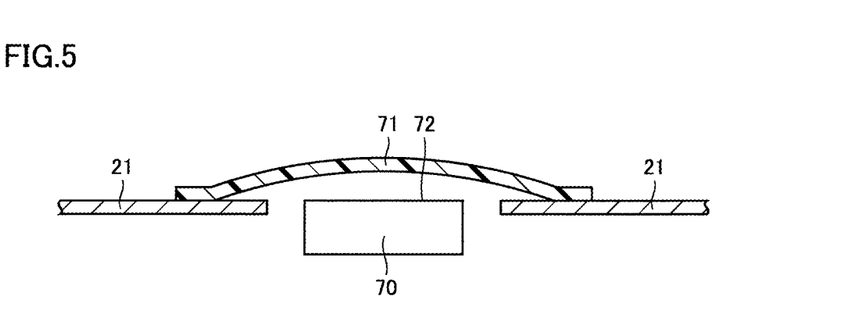
FIG. 5 is a partial cross-sectional view of the condenser unit.

FIG. 5 is a partial cross-sectional view of condenser unit 20. As shown in FIGS. 5 and 3, a sixth antenna 70 is disposed in condenser unit 20. Sixth antenna 70 is a GNSS (Global Navigation Satellite System) antenna, for example.

As shown in FIG. 5, in a metal plate forming upper surface 21 of condenser unit 20, a through hole extending through the metal plate in the thickness direction is formed. Sixth antenna 70 is disposed in this through hole. Sixth antenna 70 is positioned in such a manner that a top surface 72 of sixth antenna 70 and upper surface 21 of condenser unit 20 are coplanar.

A cover 71 is spread over sixth antenna 70 (see also FIG. 2). Cover 71 is made from a material such as resin that does not interfere with communication of sixth antenna 70. The perimeter of cover 71 is fixed airtightly to upper surface 21 of condenser unit 20 to thereby protect sixth antenna 70 from wind and rain. Cover 71 protrudes upward relative to upper surface 21 of condenser unit 20.

Figure 6:
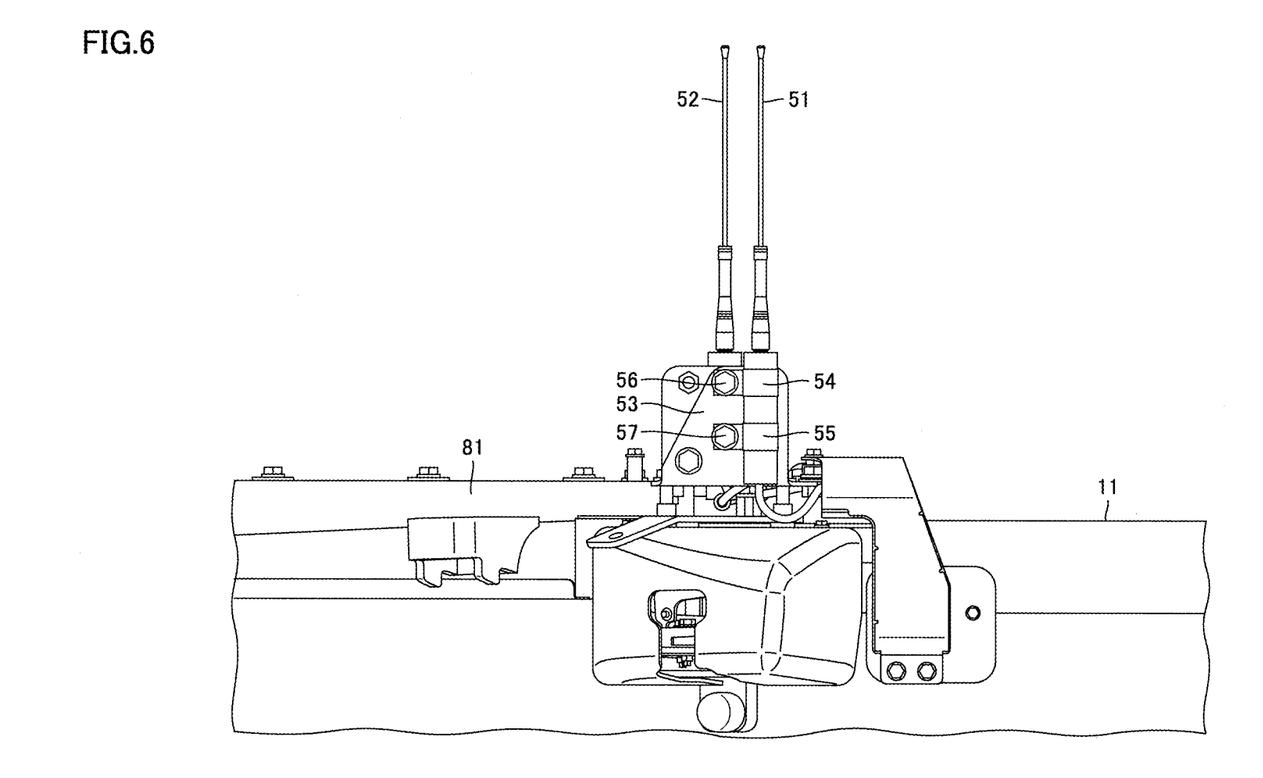
FIG. 6 is an enlarged side view of a front portion of a roof panel of the cab.

FIG. 6 is an enlarged side view of a front portion of roof panel 11 of cab 10. As shown in FIGS. 2 and 6, a third antenna 51 and a fourth antenna 52 are attached to the front portion of roof panel 11 of cab 10. Third antenna 51 and fourth antenna 52 are disposed near the upper ends of the center pillars of cab 10. Third antenna 51 is disposed on the left side of cab 10. Fourth antenna 52 is disposed on the right side of cab 10. Third antenna 51 and fourth antenna 52 are used for remote control, for example.

An attachment 53 is fixed to roof panel 11 of cab 10. Attachment 53 has a flat plate shape protruding upward relative to roof panel 11. Through holes each extending through the flat panel in the thickness direction are arranged in the top-bottom direction. An upper bolt 56 is inserted in the upper one of these through holes. A lower bolt 57 is inserted in the lower one of the through holes. Upper bolt 56 extends through an end of an upper clip 54 to be fixed to attachment 53 with a nut. Lower bolt 57 extends through an end of a lower clip 55 to be fixed to attachment 53 with a nut.

As shown in FIGS. 2 and 6, third antenna 51 is held by upper clip 54 and lower clip 55 surrounding a portion of third antenna 51 that is located near the lower end of third antenna 51. Thus, third antenna 51 is fixed to roof panel 11 of cab 10. Fourth antenna 52 is also fixed to roof panel 11 of cab 10 by means of a pair of clips similar to the clips for third antenna 51 (not shown).

As shown in FIGS. 2 and 3, a fifth antenna 60 is attached near the upper end of the left rear pillar of cab 10. Fifth antenna 60 is an antenna for receiving radio broadcasting, for example. An attachment 63 is fixed to the side surface of cab 10, and fifth antenna 60 is attached to attachment 63 with an attachment bolt 64. A wire 65 is connected to fifth antenna 60. Wire 65 extends into condenser unit 20.

In the arrangement shown in FIGS. 1 to 6, first antenna 30, third antenna 51, fourth antenna 52, and fifth antenna 60 each extend substantially perpendicularly to roof panel 11 of cab 10 or upper surface 21 of condenser unit 20, and protrude upward from the roof of cab 10. The posture assumed by each antenna as shown in FIGS. 1 to 6 is herein referred to as erected posture.

Figure 7:
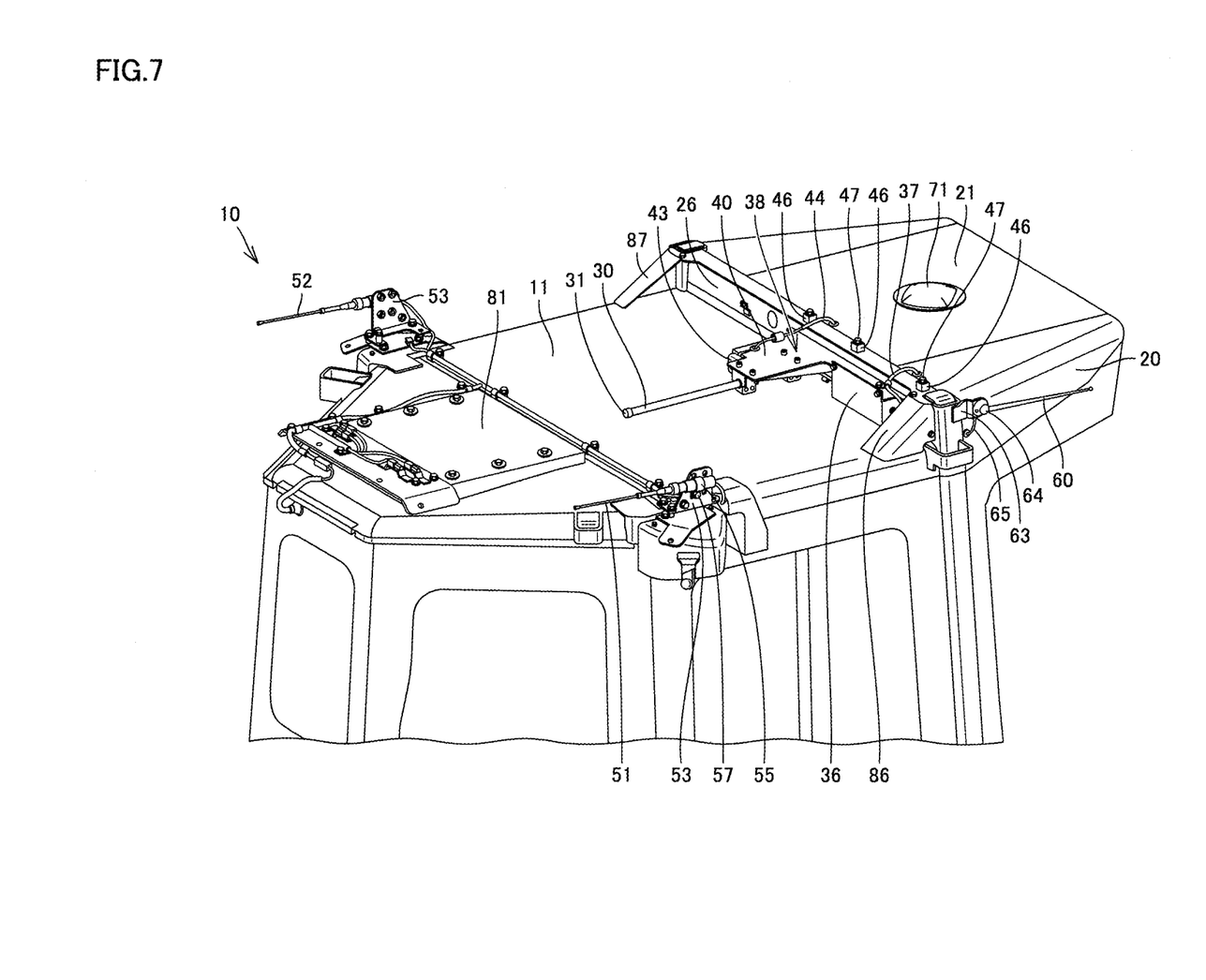
FIG. 7 is a perspective view of the cab with a plurality of antennas assuming a retracted posture.

FIG. 7 is a perspective view of cab 10 with a plurality of antennas assuming a retracted posture. In FIG. 7 and subsequent FIGS. 8 to 10, each antenna assumes a posture that has been changed from the one shown in FIGS. 1 to 6. The posture of each antenna shown in FIGS. 7 to 10 is herein referred to as a retracted posture. The antenna of the present embodiment is configured to be switchable between the erected posture and the retracted posture.

FIG. 7 shows a state where rollover protection structure 90 shown in FIGS. 1 and 2 has been removed from bulldozer 1, and container box 84 has also been removed from roof panel 11. For transportation of bulldozer 1, rollover protection structure 90 is removed from bulldozer 1 and container box 84 is removed from roof panel 11 of cab 10. FIG. 7 shows components that are mounted on the roof of cab 10 during the transportation. FIG. 7 shows an appearance of cab 10 during the transportation.

Figure 8:
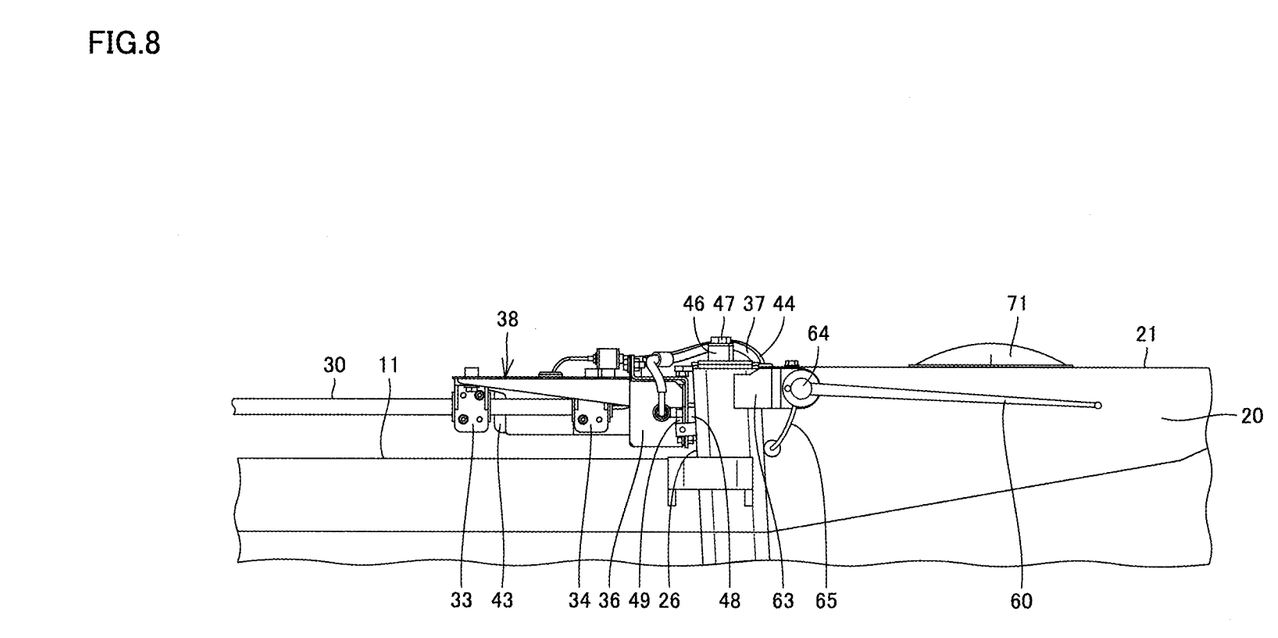
FIG. 8 is an enlarged side view of a first antenna assuming a retracted posture.

FIG. 8 is an enlarged side view of first antenna 30 assuming the retracted posture. As shown in FIGS. 7 and 8, bracket 38 on which first antenna 30 and second antenna 43 are mounted is fixed to pedestals 48 disposed on step riser surface 26, rather than pedestals 46 attached to upper surface 21 of condenser unit 20.

Respective fastening bolts 47 are all removed from three pedestals 46 to thereby remove bracket 38 from pedestals 46. Subsequently, fastening bolts 49 are removed temporarily from pedestals 48, then inserted through bottom portion 39 of bracket 38 and tightened into pedestals 48 to thereby fix bracket 38 to pedestals 48. In this way, first antenna 30 and second antenna 43 are fixed to pedestals 48 with bracket 38 interposed therebetween, to thereby assume the retracted posture.

Bracket 38 is fixed to pedestals 46 by tightening fastening bolts 47 into pedestals 46. Bracket 38 is fixed to pedestals 48 by tightening fastening bolt 49 into pedestals 48. Since bracket 38 is fixed to pedestals 46, 48 by the same means, the work for changing the posture of bracket 38 is simple and plain.

Wire 37 which is connected to first antenna 30 through wire 35 and the modem extends into condenser unit 20. Wire 37 has an extra length in condenser unit 20, and wire 37 is loosened in condenser unit 20. Wire 44 which is connected to second antenna 43 extends into condenser unit 20. Wire 44 has an extra length in condenser unit 20, and wire 44 is loosened in condenser unit 20. In FIGS. 7 and 8 as compared with FIGS. 2 and 3, required lengths of extra wires 37, 44 are drawn out from condenser unit 20, and the length of each of wires 37, 44 that extends outside condenser unit 20 is increased.

Even when first antenna 30 and second antenna 43 switch from the erected posture to the retracted posture, the electrical connection between first antenna 30 and wire 37 remains the same and the electrical connection between second antenna 43 and wire 44 remains the same. The posture of the antennas can be changed without the need to detach and attach wires 37, 44 from and to the antennas, and therefore, the operation at the work site required for changing the posture of first antenna 30 and second antenna 43 is simplified.

FIGS. 7 and 8 also show fifth antenna 60 assuming the retracted posture. Attachment bolt 64 is loosened, fifth antenna 60 is rotated about attachment bolt 64 serving as a rotational center, and fifth antenna 60 is tilted rearward. In this way, fifth antenna 60 is switched from the erected posture to the retracted posture. Attachment bolt 64 serves as a rotational shaft about which fifth antenna 60 is rotated. After the posture of fifth antenna 60 is changed, attachment bolt 64 is tightened again into attachment 63.

Figure 9:
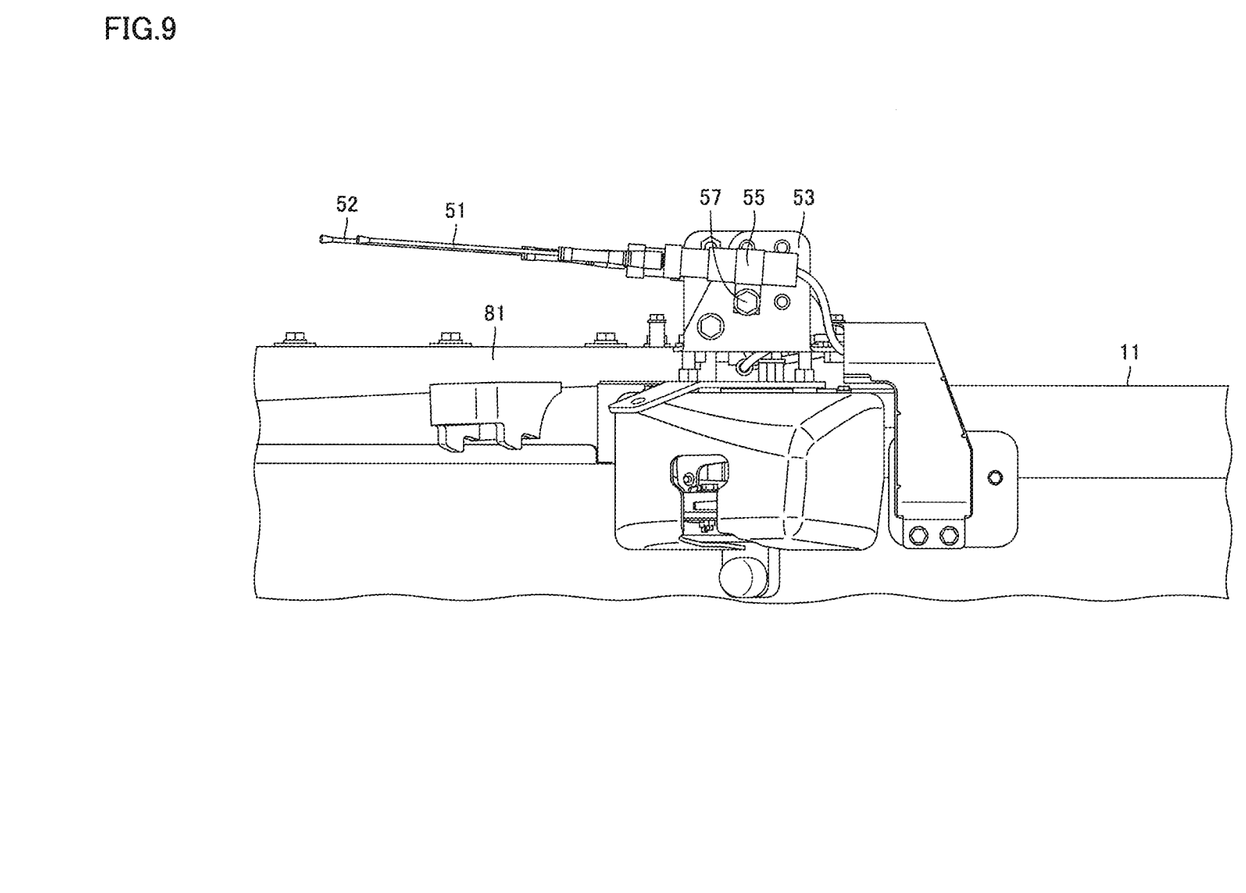
FIG. 9 is an enlarged side view of a third antenna assuming a retracted posture.

FIG. 9 is an enlarged side view of third antenna 51 assuming the retracted posture. As shown in FIGS. 7 and 9, upper bolt 56 has been removed from attachment 53, and third antenna 51 assuming the retracted posture is supported by lower clip 55 only.

Upper bolt 56 is removed from attachment 53 to release third antenna 51 from being held by upper clip 54. Subsequently, lower bolt 57 is loosened, third antenna 51 and lower clip 55 are rotated about lower bolt 57 serving as a rotational center, and third antenna 51 is tilted forward. In this way, third antenna 51 is switched from the erected posture to the retracted posture. Lower bolt 57 serves as a rotational shaft about which third antenna 51 is rotated. After the posture of third antenna 51 is changed, lower bolt 57 is tightened again into attachment 53.

Fourth antenna 52 is also switched in posture from the erected posture to the retracted posture in accordance with a similar procedure to that for third antenna 51.

Figure 10:
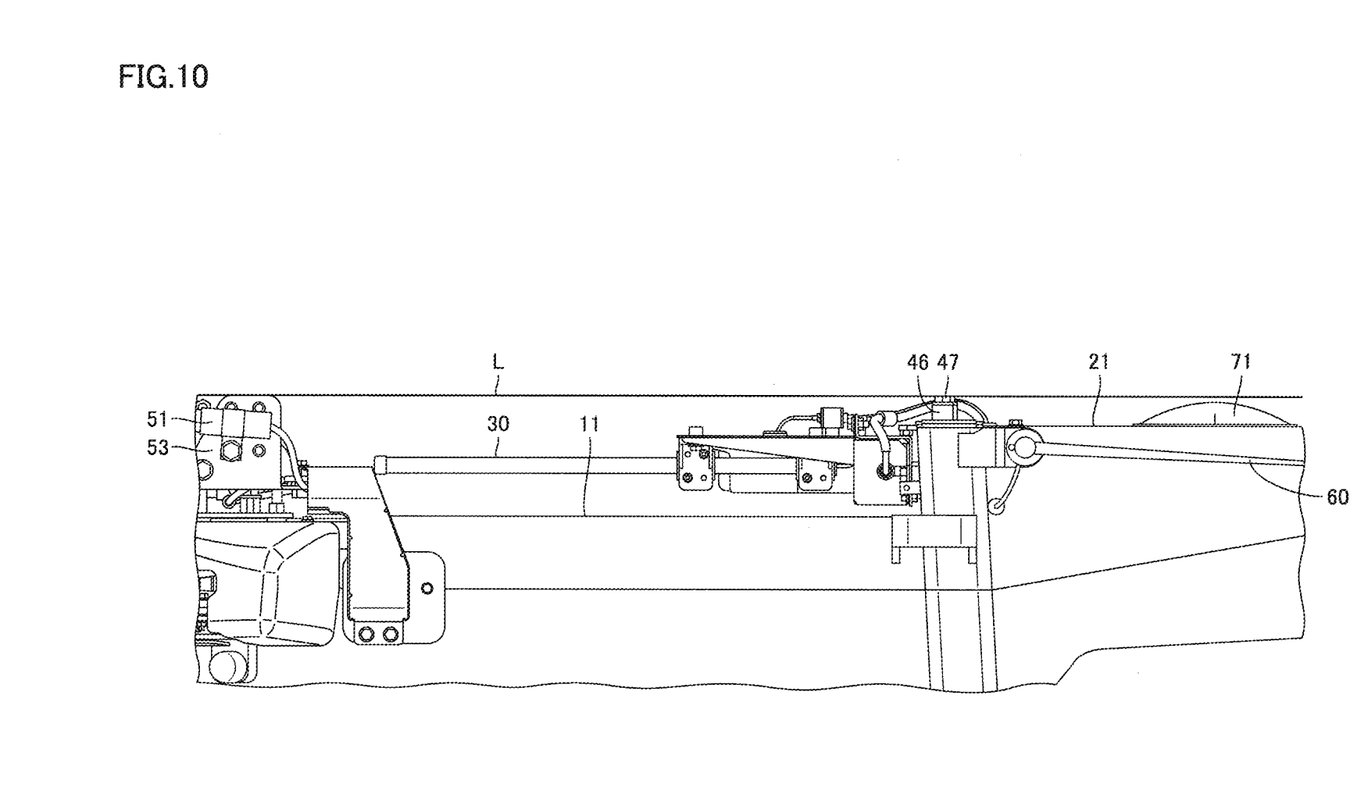
FIG. 10 is a schematic diagram showing an arrangement of antennas with respect to a topmost portion of a roof of the cab.

FIG. 10 is a schematic diagram showing an arrangement of antennas with respect to the topmost portion of the roof of cab 10. Line L shown in FIG. 10 represents a line extending horizontally through the topmost portion of the roof of cab 10. As shown in FIG. 10, the top surface of the head of fastening bolt 47 tightened into pedestal 46 defines the topmost portion of the roof of cab 10.

Sixth antenna 70 is coplanar with upper surface 21 of condenser unit 20, and therefore, the whole sixth antenna 70 is located lower than line L and thus lower than the topmost portion of the roof.

First antenna 30 and second antenna 43 that assume the retracted posture are entirely located closer to roof panel 11 than to line L, and located lower than the topmost portion of the roof. Third antenna 51, fourth antenna 52, and fifth antenna 60 that assume the retracted posture are also located lower than the topmost portion of the roof. All of a plurality of, specifically first to fifth antennas are located lower than the topmost portion of the roof and attached to the roof.

In contrast, first antenna 30, second antenna 43, third antenna 51, fourth antenna 52, and fifth antenna 60 that assume the erected posture protrude upward relative to the top surface of the head of fastening bolt 47 tightened into pedestal 46 with bottom portion 39 of bracket 38 interposed therebetween, as shown in FIGS. 1 and 2.

First antenna 30, second antenna 43, third antenna 51, fourth antenna 52, and fifth antenna 60 each assuming the retracted posture are located lower than the topmost portion of the roof. First antenna 30, second antenna 43, third antenna 51, fourth antenna 52, and fifth antenna 60 each assuming the erected posture are partially located higher than the topmost portion of the roof. First antenna 30, second antenna 43, third antenna 51, fourth antenna 52, and fifth antenna 60 are positionable at a lower position located lower than the topmost portion of the roof, and positionable at an upper position protruding upward relative to the topmost portion of the roof. First antenna 30, second antenna 43, third antenna 51, fourth antenna 52, and fifth antenna 60 are each positionable selectively at one of the lower position and the upper position.

First antenna 30 and second antenna 43 that assume the erected posture are fixed to pedestals 46 with fastening bolts 47. Pedestals 46 and fastening bolts 47 have a function of an upper support for supporting first antenna 30 disposed at the upper position. First antenna 30 and second antenna 43 that assume the retracted posture are fixed to pedestals 48 with fastening bolts 49. Pedestals 48 and fastening bolts 49 have a function of a lower support for supporting first antenna 30 disposed at the lower position. First antenna 30 disposed at the lower position is rigidly fixed immovably to the roof of cab 10.

First antenna 30 disposed at the lower position is located above roof panel 11 which forms the lower stage surface of the step of the roof of cab 10. First antenna 30 disposed at the lower position is disposed above roof panel 11 so as not to be in contact with roof panel 11. First antenna 30 disposed at the lower position is located at a position that overlaps roof panel 11 but does not overlap condenser unit 20, as seen in plan view.

In contrast, first antenna 30 disposed at the upper position is located above upper surface 21 of condenser unit 20 that forms the upper stage surface of the step of the roof of cab 10. The first antenna disposed at the upper position is located above condenser unit 20. First antenna 30 disposed at the upper position is located at a position that overlaps condenser unit 20 but does not overlap roof panel 11, as seen in plan view.

First antenna 30 disposed at the lower position is located at a position where beam 93 is located in the state shown in FIGS. 1 and 2 depicting bulldozer 1 equipped with rollover protection structure 90. First antenna 30 disposed at the lower position is located between the center pillars and the rear pillars of cab 10 in the front-rear direction. First antenna 30 disposed at the lower position is located at a position where first antenna 30 overlaps the operator's seat in cab 10 as seen in plan view of cab 10.

As seen from the foregoing, all the antennas mounted on the roof of cab 10 of bulldozer 1 in the present embodiment can be arranged entirely under line L (FIG. 10) representing the topmost portion of the roof of cab 10.

Since the antennas are arranged within the specified height of vehicular body 2 of bulldozer 1 under transport regulations, it is possible to transport vehicular body 2 with antennas mounted on the roof of cab 10. It is unnecessary to remove the antennas from cab 10 and separately transport the antennas, which can facilitate the transportation work. Accordingly, the efficiency of the transportation work for bulldozer 1 can be improved.

Above-described first antenna 30 is configured to be switchable between the erected posture and the retracted posture, by fixing bracket 38 to pedestals 46 or pedestals 48. First antenna 30 may be attached to the roof with a hinge. It should be noted, however, that bulldozer 1 is often self-propelled to run on a rough road, and therefore, the attachment with a hinge may be insufficient in terms of the strength of fixing of first antenna 30. If a hinge of a larger size is used for improving the strength of fixing, there is a possibility that the height specified by transport regulations is exceeded.

In view of the above, fixing through tightening of bolts into pedestals like the present embodiment can be used to facilitate firm fixing of first antenna 30. The antenna posture is switchable to the retracted posture by merely adding three sets of pedestals 48 and fastening bolts 49 to the conventional configuration of the antenna that can assume only the erected posture. Thus, increase of the cost for making the antenna posture switchable is reduced. Moreover, even when a pedestal or a fastening bolt has been deteriorated due to an adverse environment, it can be repaired easily.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 bulldozer; 2 vehicular body; 3 blade; 4 crawler type carrier; 10 cab; 11 roof panel; 20 condenser unit; 21 upper surface; 26 step riser surface; 30 first antenna; 31 top end portion; 32 bottom end portion; 33, 34 coupling portion; 35, 37, 44, 65 wire; 36 box; 38 bracket; 39 bottom portion; 40 erect portion; 41 support portion; 43 second antenna; 46, 48 pedestal; 47, 49 fastening bolt; 51 third antenna; 52 fourth antenna; 53, 63 attachment; 54 upper clip; 55 lower clip; 56 upper bolt; 57 lower bolt; 60 fifth antenna; 64 attachment bolt; 70 sixth antenna; 71 cover; 72 top surface; 81 base; 84 container box; 86, 87 cover member; 90 rollover protection structure; 91 left column; 92 right column; 93 beam

The invention claimed is:

1. A work vehicle comprising:
a cab to be boarded by an operator, the cab including a roof; and
an antenna mounted on the roof, the antenna being positionable selectively at one of a first arrangement position located lower than a topmost portion of the roof, and a second arrangement position protruding upward relative to the topmost portion of the roof,
wherein the roof is stepped to include an upper stage surface and a lower stage surface, and
wherein the antenna positioned at the first arrangement position is located above the lower stage surface.

2. The work vehicle according to claim 1, comprising:
a lower support configured to support the antenna positioned at the first arrangement position; and
an upper support configured to support the antenna positioned at the second arrangement position.

3. The work vehicle according to claim 2, wherein the antenna positioned at the first arrangement position is fixed to the lower support.

4. A work vehicle comprising:
a cab to be boarded by an operator, the cab including a roof; and
an antenna mounted on the roof, the antenna being positionable selectively at one of a first arrangement position located lower than a topmost portion of the roof, and a second arrangement position protruding upward relative to the topmost portion of the roof,
wherein a rollover protection structure is configured to be attachable to and detachable from the work vehicle, the rollover protection structure includes:
a column located laterally to the cab of the work vehicle to which the rollover protection structure is attached; and
a beam located above the cab of the work vehicle to which the rollover protection structure is attached,
wherein the antenna positioned at the first arrangement position is located at a position from which the beam has been removed.

* * * * *